Patented Feb. 20, 1951

2,542,179

UNITED STATES PATENT OFFICE 2,542,179

HEAT STABILIZED POLYVINYL CHLORIDE COMPOSITIONS

George R. Buchanan, Jr., Affton, Mo., assignor to Monsanto Chemical Company, St. Louis, Mo., a corporation of Delaware No Drawing. Application October 31, 1947, Serial No. 783,455

11 Claims. (Cl. 260—30.6)

This invention relates to improved compositions containing predominantly polymerized vinyl chloride. More particularly, this invention relates to plasticized compositions having improved heat stability and containing polymerized vinyl chloride, vinyl chloride copolymers of predominantly vinyl chloride, or combinations thereof containing predominantly vinyl chloride, collectively and broadly herein referred to as "polyvinyl chloride compositions."

Polyvinyl chloride compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings, extruded insulation for electrical wiring and injection molded rigid articles such as bottle caps, drawing instruments and floor coverings.

The processing techniques necessary for the fabrication of many articles from polyvinyl chloride compositions often require that the compositions be exposed to elevated temperatures for extended periods of time. This is particularly true with the development of large equipment for high quantity production of articles from polyvinyl chloride compositions. The polyvinyl chloride compositions may be subjected to temperatures of 130° C. to 160° C. for sojourn times of the order of 1 hour while being processed through a series of operations such as mixing, blending and roll milling, to effect homogeneous compositions and then while still being maintained at these elevated temperatures, the compositions may be calendered, pressure molded, injection molded or passed through hot extrusion dies. When these processing times, particularly at elevated temperatures such as 160° C., have to be increased from relatively short sojourn times of the order of 5 to 15 minutes to relatively extended periods of the order of 30 minutes to one hour, many of the polyvinyl chloride compositions tend to deteriorate and decompose, resulting in darkening or discoloration.

This discoloration may vary from a faint yellow or tannish shade to a black brown through various shades of tan and brown, depending upon the mildness or severity of the conditions of time and temperature encountered. In many applications such deterioration is undesirable as accurate color control is difficult to maintain and articles of inferior or undesired coloration result. The evaluation of this tendency of a polyvinyl chloride composition to discolor on exposure to heat or elevated temperatures is commonly referred to by those skilled in the art as the composition's heat stability.

Heat stability of polyvinyl chloride compositions is also a highly important factor in the successful reworking of scraps of polyvinyl chloride compositions such as flashings, cuttings, shavings and drillings which are accumulated as a result of fabrication of articles from molding powders, sheets and blocks of polyvinyl chloride compositions. The reworking of such scraps necessitates successive extended exposures of the polyvinyl chloride compositions to elevated temperatures during the repeated passes through the mixing, blending and forming operations. The reworking of scraps of polyvinyl chloride compositions which are of poor heat stability results in such deteriorated and discolored compositions as to render them of very little value, whereas properly heat stabilized polyvinyl chloride compositions can be advantageously reworked to form useful compositions for the fabrication of articles of value.

An object of this invention is to provide new compositions, particularly plasticized compositions, containing predominantly polyvinyl chloride and having improved heat stability. A further object is to provide a method for improving the heat stability of compositions containing predominantly polyvinyl chloride. Other objects of this invention will be apparent to those skilled in the art from the following description, examples and claims.

Many compounds and compositions have been suggested in the prior art as heat stabilizers for polyvinyl chloride compositions. These various heat stabilizing compounds and compositions have been incorporated into compositions containing polyvinyl chloride to retard or prevent the initial development of discoloration or darkening and to prevent or minimize the progressive discoloration or darkening which results when polyvinyl chloride compositions are processed at elevated temperatures. The more successful of these prior art stabilizers are illustrated by compounds which may be described as "basic heat stabilizers." The use of these basic heat stabilizers such as basic lead silicate, basic silicate of white lead, basic lead carbonate, basic lead sulfate, basic lead stearate and basic lead acetate have resulted in compositions having improved heat stability characteristics, but the degree of thermal stability to be achieved by the use of these basic heat stabilizers is not wholly satisfactory, particularly when the time of processing must be of the order of 30 minutes to 1 hour at temperatures of the order of 160° C. rather than relatively short processing times of the order of 5 to 15 minutes.

However, I have found that the heat stability of compositions containing predominantly polyvinyl chloride may be substantially improved, the initial development of discoloration of polyvinyl chloride compositions exposed to elevated temperatures completely inhibited or considerably retarded, and the amount of discoloration of such compositions upon exposure to elevated temperatures may be substantially reduced by incorporating into the polyvinyl chloride compositions minor amounts of a basic heat stabilizer, as was hereinabove described, and a minor amount of cinnamic acid.

I have found that by the use of cinnamic acid in cooperation with a basic heat stabilizer, there is a synergistic heat stabilizing action between the basic heat stabilizer, in particular, basic lead salts, and cinnamic acid resulting in polyvinyl chloride compositions having thermal stabilities of improved proportions that cannot be achieved by the use of the basic heat stabilizers alone without the cooperation and synergistic heat stabilizing action of cinnamic acid. While I prefer to use 1.5 to 3% of cinnamic acid as a synergistic heat stabilizing agent for polyvinyl chloride compositions containing basic heat stabilizers, particularly those polyvinyl chloride compositions containing 0.5 to 3% of basic lead salts, cinnamic acid may be incorporated into such polyvinyl chloride compositions in amounts of the order of 0.5 to 5% with advantageous synergistic heat stabilizing effects.

All of the compositions of the following examples were processed in the following identical manner in order to evaluate the desirability and improved heat stabilizing effects to be had by using cinnamic acid as a synergistic heat stabilizing agent in polyvinyl chloride compositions containing basic heat stabilizers. This processing procedure is described as follows:

The proportional parts of the resins, plasticizers and stabilizers were weighed and intimately mixed and the mixture of resin, plasticizer and stabilizers, where used, was placed on a differential speed roll mill and further mixed and fluxed for 5 minutes at 160° C. At the end of this rolling and mixing operation, homogeneous compositions had formed on the roll mill and the plasticized polyvinyl chloride compositions were then sheeted off of the roll mill. Specimens of each composition were then placed in a mold 2" x 2" x 0.040" and subjected to a pressure of 2,000 pounds per square inch and a temperature of 160° C. After being maintained at this pressure and temperature for 30 minutes, the specimens were removed from the molds and the amount of deterioration or discoloration in each sample was observed, and the sample evaluated for its heat stability characteristics.

*Example I*

A composition comprising 60 parts by weight of a polyvinyl chloride resin and 40 parts by weight of dioctyl phthalate plasticizer, but no heat stabilizing agent, was processed in the above-described manner. The specimen, when removed from the mold, was of low transparency and had a mottled, dark reddish-brown discoloration, indicating a poor heat stability.

*Example II*

A composition was prepared containing 60 parts by weight of a polyvinyl chloride resin, 40 parts by weight of dioctyl phthalate plasticizer and 2 parts by weight of basic lead silicate, a basic heat stabilizer. When this specimen was removed from the mold it was observed to have a light tannish coloration which indicated that the composition had improved heat stability over the composition of Example I which contained no heat stabilizing material.

*Example III*

A composition was prepared containing 60 parts by weight of a polyvinyl chloride resin, 40 parts by weight of dioctyl phthalate plasticizer and 2 parts by weight of cinnamic acid and the composition was processed in the manner described above. The specimen when removed from the mold was dark black-brown and was, therefore, evaluated as having a poor heat stability.

*Example IV*

A composition was prepared containing 60 parts by weight of a polyvinyl chloride resin, 40 parts by weight of dioctyl phthalate plasticizer, 2 parts by weight of basic lead silicate and 2 parts by weight of cinnamic acid. After processing in the above described manner, the specimen was removed from the mold and was observed to have no apparent discoloration. This composition when compared with the composition of Examples II and III exemplifies the synergistic heat stabilizing action of cinnamic acid and a basic heat stabilizer.

*Example V*

A composition was prepared containing 60 parts by weight of a polyvinyl chloride resin, 40 parts by weight of dioctyl phthalate plasticizer and 2 parts by weight of tribasic lead sulfate. After processing in the above described manner, the specimen was removed from the mold and was observed to have a light orange coloration which indicated that the composition had an improved but still unsatisfactory heat stability.

*Example VI*

A composition was prepared containing 60 parts by weight of a polyvinyl chloride resin, 40 parts by weight of dioctyl phthalate plasticizer, 2 parts by weight of tribasic lead sulfate and 2 parts by weight of cinnamic acid. After processing in the above described manner, the specimen was removed from the mold and was observed to have no detectable discoloration of any kind indicating excellent heat stability.

*Example VII*

This composition contained 60 parts by weight of a polyvinyl chloride resin and 40 parts by weight of tricresyl phosphate plasticizer. After processing, the specimen was removed from the mold and was observed to have a dark brown mottled discoloration indicating very poor heat stability.

*Example VIII*

This composition contained 60 parts by weight of a polyvinyl chloride resin, 40 parts by weight of tricresyl phosphate plasticizer and 2 parts by weight of basic silicate of white lead. After processing, this specimen was removed from the mold and was observed to have a light brown discoloration, indicating an improved but still unsatisfactory heat stability.

Example IX

This composition contained 60 parts by weight of a polyvinyl chloride resin, 40 parts by weight of tricresyl phosphate plasticizer and 2 parts by weight of cinnamic acid and 2 parts by weight of the basic silicate of white lead. After processing, this specimen was removed from the mold and was observed to have only the very faintest touch of a yellowish coloration.

Examples VIII and IX should be compared in the light of the fact that those skilled in the art of plasticizing polyvinyl chloride resins recognize the fact that polyvinyl chloride compositions plasticized with tricresyl phosphate are extremely difficult to stabilize against the deleterious effects of elevated temperatures. Therefore, the composition of Example IX can be evaluated as a polyvinyl chloride composition plasticized with tricresyl phosphate of substantially improved heat stability.

Example X

This composition contained 60 parts by weight of a polyvinyl chloride resin and 40 parts by weight of octyl diphenyl phosphate plasticizer. This specimen had a red-brown mottled discoloration and had an unsatisfactory heat stability for many applications.

Example XI

This composition contained 60 parts by weight of a polyvinyl chloride resin, 40 parts by weight of octyl diphenyl phosphate plasticizer and 1 part by weight of basic lead silicate. After processing, the specimen was observed to be of a light brown coloration, and while the heat stability was improved over that of the composition in Example VIII, the heat stability is not satisfactory for many applications.

Example XII

This composition contained 60 parts by weight of a polyvinyl chloride resin, 40 parts by weight of octyl diphenyl phosphate plasticizer, 2 parts by weight of cinnamic acid and 2 parts by weight of basic lead silicate. After processing, the specimen was observed to have only a light yellow coloration indicating a substantially improved heat stability.

Example XIII

This composition contained 75 parts by weight of a polyvinyl chloride resin, 25 parts by weight of octyl diphenyl phosphate plasticizer and 2 parts by weight of a basic lead silicate. After processing, the specimen was observed to have a dark orange coloration indicating an unsatisfactory heat stability.

Example XIV

This composition contained 75 parts by weight of a polyvinyl chloride resin, 25 parts by weight of octyl diphenyl phosphate plasticizer, 2 parts by weight of cinnamic acid, and 2 parts by weight of a basic lead sulfate. After processing, the specimen was observed to have no detectable discoloration and could be evaluated as having an excellent heat stability.

Example XV

This composition contained 60 parts by weight of a polyvinyl chloride resin, 40 parts by weight of 2-ethylhexyl diphenyl phosphate plasticizer, 2 parts by weight of basic silicate of white lead and 2 parts by weight of cinnamic acid. The molded specimen indicated no discoloration and was evaluated as having an excellent heat stability.

Example XVI

This composition contained 60 parts by weight of a polymerized vinyl resin formed by the conjoint polymerization of substantially 15% vinyl acetate and 85% vinyl chloride, 32 parts by weight of 2-ethylhexyl diphenyl phosphate plasticizer and 5 parts by weight of cinnamic acid, and 3 parts by weight of basic lead silicate. The molded specimen had only the faintest trace of yellow coloration and was considered as having an excellent heat stability.

Example XVII

This composition contained 75 parts by weight of a polymerized vinyl resin formed by the copolymerization of substantially 90% vinyl chloride and 10% vinylidene chloride, 25 parts by weight of dioctyl phthalate plasticizer and 3 parts by weight of basic lead stearate and 1.5 parts by weight of cinnamic acid. The molded specimen was observed to have only the slightest detectable yellow coloration and was evaluated as having an excellent heat stability.

Example XVIII

A composition was prepared containing 75 parts by weight of a polyvinyl chloride resin, 25 parts by weight of butyl benzyl phthalate plasticizer and 1.5 parts by weight of basic lead silicate and 1.5 parts by weight of cinnamic acid. The specimen, when removed from the mold evidenced no discoloration of any kind and was, therefore, evaluated as having an excellent heat stability.

Example XIX

A composition was prepared containing 65 parts by weight of a polyvinyl chloride resin, 35 parts by weight of trioctyl phosphate, 2 parts by weight of basic lead silicate and 2 parts by weight of cinnamic acid. After processing, the specimen was observed to have only the faintest touch of a yellow coloration indicating an excellent heat stability.

Example XX

Five parts polymerized vinyl chloride were dissolved into 50 parts of methyl ethyl ketone. To this solution was added 0.2 part by weight of basic lead silicate and 0.2 part by weight of cinnamic acid. This mixture of polyvinyl chloride, methyl ethyl ketone, lead silicate and cinnamic acid was cast on a glass plate to form a 6 mil film. The glass plate and polyvinyl chloride composition film were placed in a Freas forced draft circulating oven and the temperature gradually increased until all of the methyl ethyl ketone had been evaporated and a film comprised of polyvinyl chloride, basic lead silicate and cinnamic acid remained on the glass plate. The glass plate and film were then subjected to 160° C. temperature in the oven for 30 minutes. At the end of this time the film was stripped from the glass plate and inspected for evidence of thermal decomposition. The film had an excellent heat stability in that there was no apparent discoloration of the polyvinyl chloride composition film.

The result of the above examples should be evaluated with a view to the facts that the processing conditions were relatively severe with respect to both time and temperature. While some of the composition containing cinnamic acid and a basic heat stabilizer developed faint touches of a yellow coloration, many of the compositions were absolutely colorless. However, the most widely accepted commercial stabilizers for polyvinyl chloride compositions, under the same severe conditions, although satisfactory under milder conditions, develop dark colors of red-orange to brown. The use of cinnamic acid as a synergistic heat stabilizing agent for polyvinyl chloride compositions containing basic heat stabilizers substantially improved the heat stability of all the polyvinyl chloride compositions to a highly satisfactory and useful degree.

The compositions of this invention may also contain carbon black, zinc oxide, clay, wood flour, and other pigments and fillers commonly used in the plastics industry. The stabilizing effect of the thermal stabilizers of this invention are realized in unplasticized compositions as well as compositions that are plasticized with many of the common plasticizers used in the plastic industry such as dioctyl phthalate, tricresyl phosphate, octyl diphenyl phosphate and mixed aryl phosphates.

Though particular reference has been made to compositions of polyvinyl chloride resins, the herein described combinations of cinnamic acid and a basic heat stabilizer, particularly a basic lead salt, may be very desirably used to heat stabilize compositions containing resins that are formed through the conjoint polymerization of mixtures of monomers that are predominantly vinyl chloride, such as mixtures of predominantly vinyl chloride and varying amounts of vinyl esters of carboxylic acids. These copolymers containing predominantly vinyl chloride are exemplified by copolymers containing 95% to 80% by weight of vinyl chloride and 5 to 20% by weight of vinyl acetate, vinyl fluoride, vinylidene chloride, diethyl maleate or methyl methacrylate.

Though I have herein set forth specific embodiments of my invention, it is not my intention to be limited wholly thereto. For to those skilled in the art, there are many apparent variations and modifications such as the variation of quantities of resins and plasticizers and substitution of equivalent materials that do not depart from the scope of my invention as set forth in the following claims.

I claim:

1. A polyvinyl chloride composition characterized by improved heat stability and being comprised of a polymerized vinyl resin containing at least 80% of combined vinyl chloride, 0.5 to 3% of a basic lead salt and 0.5 to 5% of cinnamic acid.

2. A polyvinyl chloride composition characterized by improved heat stability and being comprised of a polymerized vinyl resin containing at least 80% of combined vinyl chloride, 1.5 to 3% of a basic lead salt and 1.5 to 3% of cinnamic acid.

3. A plasticized polyvinyl chloride composition characterized by improved heat stability and being comprised of a polymerized vinyl resin containing at least 80% of combined vinyl chloride, a neutral phosphate ester plasticizer, 0.5 to 3% of a basic lead salt and 0.5 to 5% of cinnamic acid.

4. A plasticized polyvinyl chloride composition characterized by improved heat stability and being comprised of polymerized vinyl chloride, a neutral phosphate ester plasticizer, 0.5 to 3% of a basic lead salt and 0.5 to 5% of cinnamic acid.

5. A plasticized composition comprising a polymerized vinyl resin formed by the copolymerization of 95 to 80% vinyl chloride and 5 to 20% vinyl acetate, a neutral phosphate ester plasticizer, 0.5 to 3% of a basic lead salt and 0.5 to 5% of cinnamic acid.

6. A polyvinyl chloride composition characterized by improved heat stability and being comprised of a polymerized vinyl resin containing at least 80% of combined vinyl chloride, a plasticizer for said polymerized vinyl resin, 0.5 to 3% of a basic lead salt and 0.5 to 5% of cinnamic acid.

7. A plasticized composition comprising a polymerized vinyl resin containing at least 80% of combined vinyl chloride, a neutral phthalate ester plasticizer, 0.5 to 3% of a basic lead salt and 0.5 to 5% of cinnamic acid.

8. A plasticized composition comprising polymerized vinyl chloride, a neutral phthalate ester plasticizer, 0.5 to 3% of a basic lead salt and 0.5 to 5% of cinnamic acid.

9. A plasticized composition comprising polyvinyl chloride, dioctyl phthalate, 0.5 to 3% of a basic lead salt and 0.5 to 5% of cinnamic acid.

10. A plasticized composition comprising a polymerized vinyl resin formed by the copolymerization of 95 to 80% vinyl chloride and 5 to 20% vinyl acetate, a neutral phthalate ester plasticizer, 0.5 to 3% of a basic lead salt and 0.5 to 5% of cinnamic acid.

11. A plasticized composition comprising a polymerized vinyl resin formed by the copolymerization of substantially 90% vinyl chloride and 10% vinylidine chloride, a neutral phthalate ester plasticizer, 0.5 to 3% of a basic lead salt and 0.5 to 5% of cinnamic acid.

GEORGE R. BUCHANAN, JR.

REFERENCES CITED

The following references are of record in the file of this patent:

UNITED STATES PATENTS

| Number | Name | Date |
|---|---|---|
| 2,075,543 | Reed et al. | Mar. 30, 1937 |

FOREIGN PATENTS

| Number | Country | Date |
|---|---|---|
| 381,013 | Italy | June 17, 1940 |